(No Model.)

F. S. ARMSTRONG.
COMBINED SEEDER, PLOW, AND HARROW.

No. 291,125. Patented Jan. 1, 1884.

Witnesses:
H. N. Wills
Rich'd A. Goldsbrough

Inventor,
Festus S. Armstrong.
per A. B. Upham,
Attorney in fact.

UNITED STATES PATENT OFFICE.

FESTUS S. ARMSTRONG, OF SECOR, ILLINOIS.

COMBINED SEEDER, PLOW, AND HARROW.

SPECIFICATION forming part of Letters Patent No. 291,125, dated January 1, 1884.

Application filed May 17, 1883. (No model.)

*To all whom it may concern:*

Be it known that I, FESTUS S. ARMSTRONG, of Secor, in the county of Woodford, in the State of Illinois, have invented a Combined Seeder, Plow, and Harrow; and I do hereby declare that the following is a full, clear, and exact description thereof, reference being had to the annexed drawings, making a part of this specification, in which like letters of reference refer to like parts, and in which—

Figure 1:
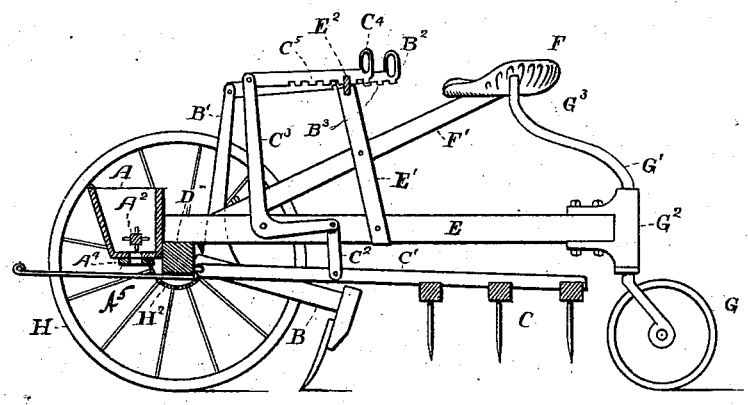
Figure 2:
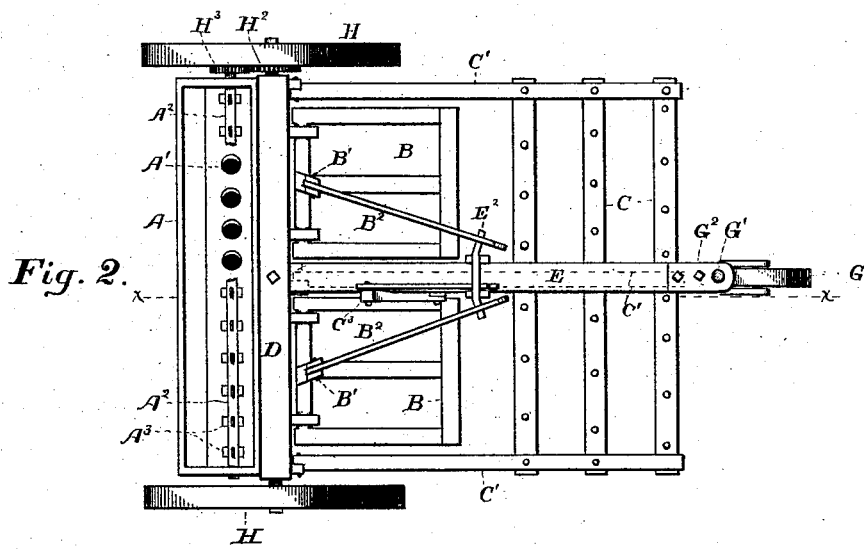

Figure 1 represents a sectional elevation through $x\,x$; Fig. 2, a plan view.

My invention consists of a frame supported by driving-wheels H and a guiding-wheel, G, of a seed-box arranged to drop seed by mechanism operated by said driving-wheels, and of separate plow and harrow frames pivoted to said frame, and provided with suitable levers for raising and lowering them from and to the ground.

In the drawings, the T-shaped frame D E is supported by the driving-wheels H H and the guiding-wheel G. One of said wheels H has fastened to it a spur-gear, $H^2$, which meshes with a smaller spur-gear, $H^3$, keyed to the end of the shaft $A^2$. Said shaft $A^2$, running entirely through the seed-box A, is made square in cross-section, and has fixed to it on each of the four sides a row of projections, $A^3$. This shaft $A^2$ revolves almost in contact with the bottom A', through which are the openings $A^4$. Beneath said bottom A' is a false bottom, $A^5$, having openings through it to correspond with those in A'. This false bottom $A^5$ is adapted to be adjusted longitudinally, and so contract or enlarge the openings $A^4$ to suit different kinds of grain.

The plow portion of my machine consists of the two frames B B, pivoted at their front sides to the bar D, and provided at their rear sides with three or more plow-blades each. These frames are moved about their pivotal edges to bring the plow-blades in contact with or up away from the ground by means of the bars $B^2$, connected with the upper end of the vertical arms B', fastened to said frames B. The bars $B^2$ have notches formed in their under side, which, by engaging with the upper edges of the collars $E^2$, through which they play, hold the shovel-frames B in any desired position. Said collars $E^2$ are made fast to the brace-bars E' E', which also serve to hold the seat-supporting beam F'.

The bars C, into which the harrow-teeth are inserted, are fastened to the three long beams C', one at their ends and one in the center. The forward ends of said beams C' are pivoted to the frame-bar D, and the free end of this harrow-frame is raised or lowered by means of the angle-iron $C^3$, pivoted to the beam E. The horizontal arm of said angle-iron $C^3$ is connected to the central beam, C', of the harrow-frame by a rod, $C^2$. The vertical arm of said angle-iron $C^3$ is moved horizontally to raise and lower said harrow-frame C, in the same way as the arm B'—that is, by a toothed or notched bar, $C^3$, movable in a collar, $E^2$, fast to the upper ends of the braces E'.

I design to dispense with a tongue in dragging this machine, but to guide it by means of the wheel G and steering-lever $G^3$, rotative in the bearing $G^2$, secured to the end of the beam E.

In using this machine its forward advancement rotates, through its drive-wheel H and gears $H^2\,H^3$, the shaft $A^2$, which, by its projections $A^3$, keeps the grain in the seed-box A in constant agitation, and also forces it regularly through the openings $A^4$, from whence it drops to the ground. The harrow and plow parts are used together, or separately, as desired, being raised out of the way or pressed into the ground by the rods $B^2$ and $C^2$.

What I claim as my invention is as follows:

1. The frame D E, having supporting-wheels H H and G, in combination with the harrow C C', pivoted to the frame-beam D, rod $C^2$, angle-iron $C^3$, notched bar $C^4$, and braces E', having collars $C^5$, substantially as and for the purpose set forth.

2. In a combined seeder, plow, and harrow, the frame D E, having supporting-wheels H H and G, in combination with the plow-frames B, pivoted independently to the beam D, vertical arms B', notched bars $B^2$, braces E', collars $E^2\,E^2$, seat, and supporting-beam F', substantially as specified.

In testimony that I claim the foregoing invention I have hereunto set my hand this 3d day of April, 1883.

FESTUS S. ARMSTRONG.

Witnesses:
CHAS. A. NOFSINGER,
E. L. HEREFORD.